No. 870,547.
PATENTED NOV. 12, 1907.
O. CULLMAN.
BOLT LOCK.
APPLICATION FILED SEPT. 13, 1906.
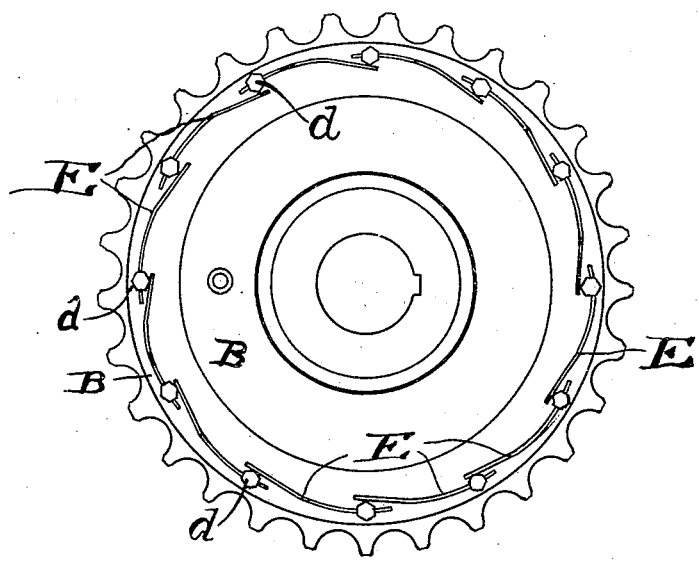
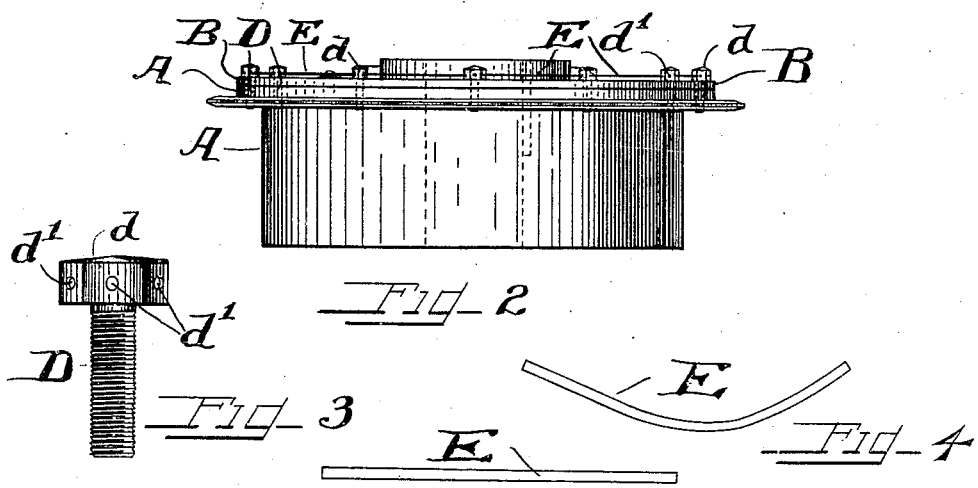
Witnesses.
Inventor
Otto Cullman,
per
Charles Turner Brown,
Attorney.

UNITED STATES PATENT OFFICE.

OTTO CULLMAN, OF CHICAGO, ILLINOIS.

BOLT-LOCK.

No. 870,547.  Specification of Letters Patent.  Patented Nov. 12, 1907.

Application filed September 13, 1906. Serial No. 334,497.

*To all whom it may concern:*

Be it known that I, OTTO CULLMAN, a citizen of the United States, and a resident of Chicago, in the county of Cook and State of Illinois, have invented certain new and useful Improvements in Bolt-Locks, of which the following, when taken in connection with the drawing accompanying and forming a part hereof, is a full and complete description sufficient to enable those skilled in the art to which it pertains to understand, make, and use the same.

This invention relates to locks for bolts (or cap screws, hereinafter included under the term "bolts") which are liable to become loosened as by jars or shocks or from other causes; and the purpose of the invention is to obtain means for so locking a bolt that it will not become loosened by the jar, shock or movement incident to the operation of the machine or device of which such bolt forms a part.

This invention is of particular value when applied to the bolts which secure the head or cap of the shell or casing of an automobile equalizer to such shell or casing, and I have so constructed such equalizers as to embody this invention therein applied to the bolts thereof, and Figure 1 is a top plan view of an automobile equalizer embodying this invention. Fig. 2 is a side elevation of an automobile equalizer embodying this invention. Fig. 3 is an elevation of a bolt forming an element of a device embodying this invention. Fig. 4 is a plan view of a spring forming an element of a device embodying this invention, such spring being substantially in the position it assumes when in use and under tension and, Fig. 5 is a plan view of a spring forming an element of a device embodying this invention, when not under tension.

A reference letter applied to designate a given part is used to indicate such part throughout the several figures of the drawing, wherever the same appears.

A is the casing of an automobile equalizer.

B is the cover of the equalizer.

D, D, are the bolts by means of which the cover B is secured in place on the casing A, and d, d, are the heads of the bolts D, D, respectively.

d', d', d', are holes in heads d, d, respectively. The number of holes through the head of a given bolt preferably corresponds with the number of sides to such head, as, for instance where a bolt is used having a six sided head I make three holes therethrough, and when the bolt is screwed firmly in position the spring E is inserted in one of the holes, that is, the straight spring is passed through one of the holes in the head of the bolt, and put under tension in a direction tending to turn the bolt further in and the free end of such spring is then forced over or to one side of a projection, as the head d of an adjacent bolt to maintain such spring under such tension. The spring E is moved longitudinally in the hole through which it is passed to force the free end thereof to one side of a projection, or to retract it from engagement with a projection.

Where a series of bolts are used to secure the cover of a cylindrical shell or casing in place, as in the construction illustrated in Figs. 1 and 2 of the drawing one end of the spring which extends through one of the holes in the head of one bolt is sprung over the head of an adjacent bolt and a series of springs is thus obtained, the end of the last placed spring of the series engaging with the head of the bolt which is first put in place.

I find that where a bolt having a six sided head is used, with three holes through the head, that when such bolt is secured in place the head thereof will at all times be in place so that the spring can be inserted in one of the holes and bent or forced over the head of an adjacent projection, as the head of an adjacent bolt, to hold the bolt firmly in place.

When a bolt is to be removed the spring is disengaged from the projection whereby it is maintained under tension, thereby releasing the spring, such spring is then taken from the head of the bolt, and the bolt removed in the ordinary way, without disturbing any of the remaining bolts.

It is evident that when but two bolts are to be locked in place by this device one end of the spring in each bolt is engaged with the head of the other bolt or with any other properly placed projection.

Having thus described my invention what I claim as new and desire to secure by Letters Patent is;—

The combination of bolts arranged so that adjacent bolts constitute the first and last bolts of a series, a series of holes extending through the head of each bolt, and springs, each bolt having one of such springs passed through one of the holes thereof, such springs arranged to be substantially straight when not under tension and so that the free end of a spring which is passed through a hole in the head of one bolt is in removable engagement with the head of an adjacent bolt to force the spring under tension tending to tighten the bolt to which it is attached and to be retracted from engagement with such head when moved longitudinally back in the hole; substantially as described.

OTTO CULLMAN.

In the presence of—
CHARLES TURNER BROWN,
CORA A. ADAMS.